United States Patent

[11] 3,568,613

| [72] | Inventor | Gerald W. Lange<br>Lamberton, Minn. 56152 |
|---|---|---|
| [21] | Appl. No. | 733,625 |
| [22] | Filed | May 31, 1968 |
| [45] | Patented | Mar. 9, 1971 |

[54] PRESS AND GAUGE WHEEL ATTACHMENT FOR GRAIN DRILL
4 Claims, 11 Drawing Figs.

[52] U.S. Cl. .................................................. 111/86,
172/398, 172/672, 172/697
[51] Int. Cl. .................................................. A01c 5/06,
A01b 63/16, A01b 63/24
[50] Field of Search .................................... 172/397,
398, 657, 697, 671, 672; 111/62, 85

[56] References Cited
UNITED STATES PATENTS
1,312,281  8/1919  Springer.................. 172/398X

| 1,517,086 | 11/1924 | Mattice...................... | 172/398X |
| 2,249,807 | 7/1941 | Brown........................ | 172/398X |
| 2,249,874 | 7/1941 | White......................... | 111/62 |
| 2,297,294 | 9/1942 | Flintjer....................... | 172/398X |
| 2,640,405 | 6/1953 | Wheeler...................... | 111/62X |
| 2,921,640 | 1/1960 | Roppel........................ | 111/85X |

FOREIGN PATENTS
54,530  3/1938  Denmark..................... 111/85

Primary Examiner—Robert E. Bagwill
Assistant Examiner—Alan E. Kopecki
Attorney—Gunnar A. Gustafson, Jr.

ABSTRACT: A gauge wheel attachment is provided for a wheel-type grain drill thus permitting the use of the grain drill as a seed planter for crops such as soybeans which require planting to a controlled depth.

3,568,613

INVENTOR.
GERALD W. LANGE
BY
HIS ATTORNEY

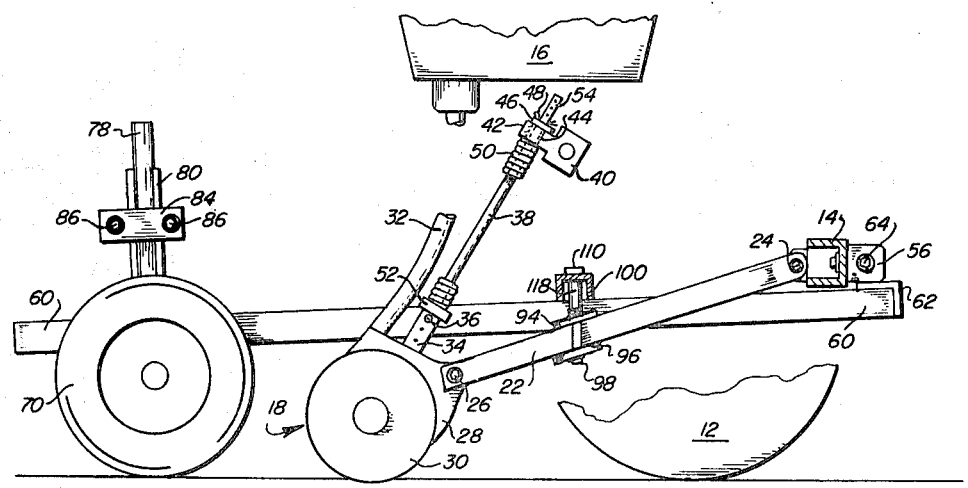

PRESS AND GAUGE WHEEL ATTACHMENT FOR GRAIN DRILL

There exist a number of devices for planting seeds of various kinds in the ground, but generally there are two broad categories. One is referred to as a grain drill and the other is generally referred to as a planter. Grain drills are designed for planting small grains such as wheat, flax, and oats. Planters are generally designed for planting corn. Grain drills are also of two broad types of which the wheel-type grain drill is perhaps the most common. In grain drills of the wheel type transport wheels are provided which support a main frame. Supported on this main frame is a single large hopper. Beneath this hopper and also supported from the main frame are a plurality of furrow openers such as discs which are pivoted to the main frame and rest upon the ground. A plurality of flexible tubes, one for each furrow opener, are provided which extend from the bottom of the hopper to each of the furrow openers to transport the seed from the hopper to the furrow opener. A rotating feeding mechanism at the bottom of the hopper insures delivery of the seed from the hopper to the flexible feeding tubes and thence to the furrow openers.

Such wheel-type grain drills have a number of advantages for small grains such as wheat, flax, and oats in that there is but a single hopper and the grain can be planted in very close rows since such grains do not require that the farmer pass through the field with cultivators. Generally the rows are 6 or 7 inches apart, as such the furrow openers are similarly spaced.

Such grain drills are only crudely adjustable for depth and are sensitive to soil conditions in so far as the depth of the planting of the seed is concerned. That is to say that with relatively loose soil the grain drill will plant the grain seed at a deeper depth than will be the case when planting in harder more compact soil. Such, however, is not a serious matter with respect to small grains such as wheat, flax, and oats, but is a serious consideration for such seeds as corn and soybeans.

Corn planters, on the other hand, which are conventionally used for planting of corn and soybean seeds are more complicated and sophisticated in design and construction since corn must be planted at a more precise depth and must be metered more carefully with respect to the quantity of seed planted. Accordingly, corn planters are provided with furrow openers which are controlled with respect to the depth of planting by means of cooperating gauge wheels which control the depth of the furrow opener and also press the soil over the seed after it has been planted. Additionally, corn planters are provided with separate hoppers and metering mechanisms for each furrow opener in order to carefully control the amount of seed dispensed and planted. Such planters are designed for planting rows of much greater spacing than a grain drill such as 24-inch, 30-inch, 36-inch rows. In recent years very sophisticated and expensive equipment has been provided for planting corn as close as 18 inches or 20 inches between the rows.

Such corn planters have the disadvantage that they require the filling of a number of individual hoppers by means of a pail by hand and are limited with respect to the closeness of the rows. While corn does require that a farmer pass through the field with a cultivator and thus requires more widely spaced rows than do the small grains such as wheat, the tendency in recent years is to narrow the rows still further. Additionally, soybeans are increasingly planted at row spacings down to as close as 12 inches and for such operations corn planters will not suffice since the separate feeding mechanisms and hoppers require a greater amount of space than is available with 12-inch rows. Accordingly, soybeans which require careful planting with respect to depth and thus have been planted by means of corn planters, present problems to farmers who wish to plant closer rows since the available corn planters cannot plant rows as close as desired.

Applicant has invented a press and gauge wheel attachment for the wheel-type grain drill which will permit its use for the planting of soybeans and certain of the newer varieties of corn which do not require careful metering as to the quantity of seed dispensed and planted.

All of the above and other advantages will be apparent to those skilled in the art from the following description and drawings in which:

FIG. 3 is a view taken along the line 3–3 of FIG. 2.

FIG. 4 is an enlargement of a portion of the device taken along the line 4–4 of FIG. 2.

FIG. 5 is an enlargement of a portion of the device taken along the line 5–5 of FIG. 2.

FIG. 6 is a view taken along the lines 6–6 of FIG. 5.

FIG. 9 is an enlarged view taken along the line 9–9 of FIG. 7.

FIG. 10 is an enlarged view taken along the line 10–10 of FIG. 7.

FIG. 11 is an enlarged view taken along the line 11–11 of FIG. 8.

Figure 1:
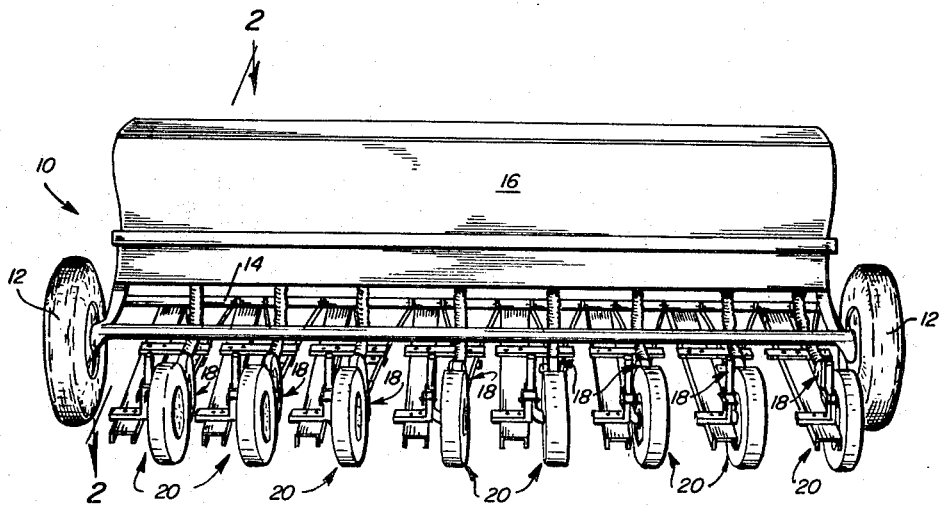
FIG. 1 shows a conventional wheel-type grain drill, as shown from the rear, with my attachment in place.

In FIG. 1 a conventional wheel-type grain drill 10 is shown having transport wheels 12 supporting a frame 14. Upon the frame 14 is mounted a hopper 16 and a plurality of furrow openers 18. Alternate ones of the furrow openers 18 have been replaced by my press and gauge wheel attachment 20. As shown, each of the press and gauge wheel attachments 20 controls the depth of the furrow opener 18 immediately adjacent thereto (the adjacent one on the right as shown in the FIG. 1).

Figure 2:
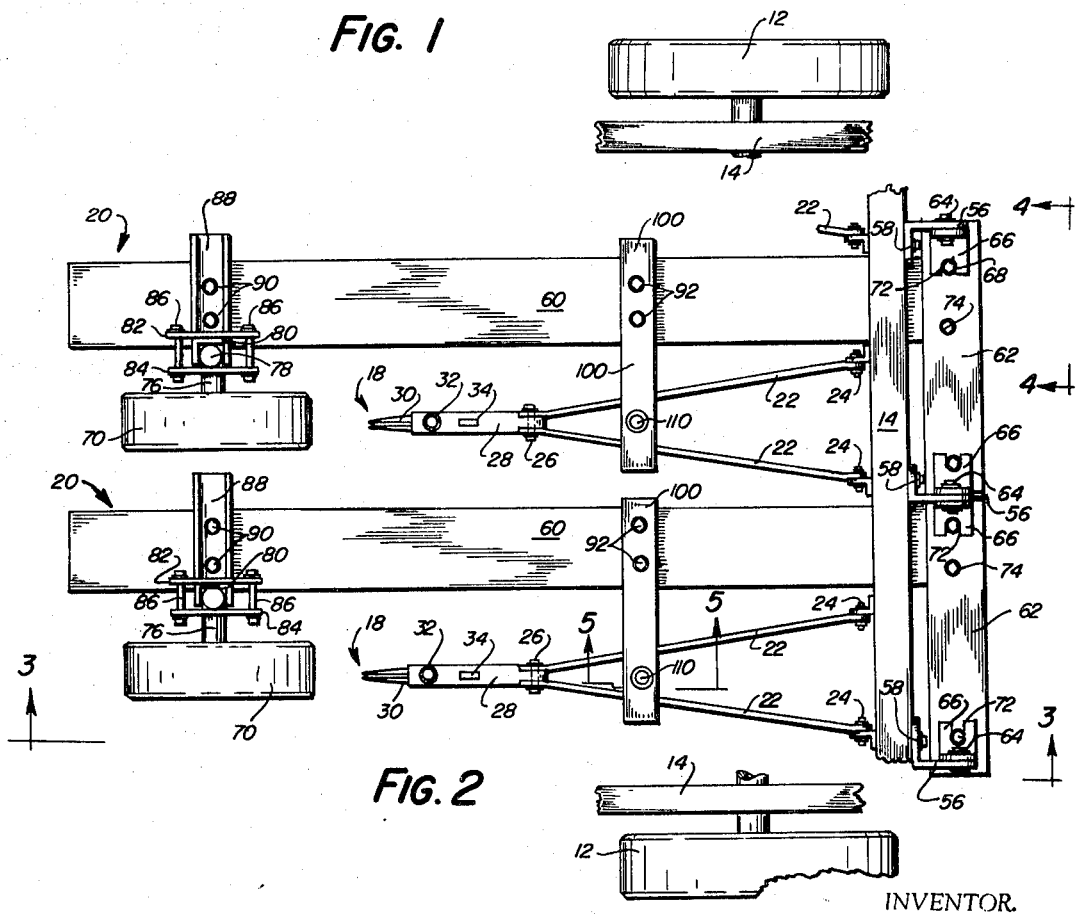
FIG. 2 is a view taken along the line 2–2 of FIG. 1 with only two gauge wheel attachments and two furrow openers shown for clarity.

As best shown in FIG. 2 each of the furrow openers 18 is supported by two forwardly extending members 22 pivoted at 24 to a forward portion of the frame 14. At their rearward ends, arms 22 are fixed, as by means of a bolt 26 to a casting 28. The casting 28 has journaled thereon two furrow opening discs 30 which are spaced at the top and angled downwardly more closely toward each other at the to bottom but also spaced at the bottom. At the top of the casting 28 is an opening which opens into the space between the top of the discs 30 and is connected by a feeder tube 32 to the bottom of the hopper 16. A bracket 34 fixed to the top of the casting 28 has connected thereto at 36 a rod 38. The rod 38 extends upwardly through an arm 42 on a square lifter bar 40. The rod 38 passes loosely through an oversized opening 44 in the arm 42 in order to permit the rod 38 to move longitudinally through the arm 42. At the top of the arm 42 the rod 38 is provided with a washer 46 larger than the opening 44 held in place by a pin 48. This arrangement limits the downward movement of the rod 38 through the hole 44 in the arm 42. A compression spring 50 is compressed between the arm 42 and a laterally extending flange 52 on the bracket 34. The lifter bar 40 is journaled at a suitable place, not shown, in the frame 14 for rotation about its axis. Thus by rotating the lifter bar 40 the several furrow openers 18 may be raised and lowered into and out of operative position as they move about their pivots 24. While some adjustment of the depth of the furrow openers 18 may be accomplished by control of the amount of rotation of the lifter bar 40, such adjustment is very limited and, furthermore, adjusts all of the furrow openers 18 the same since all of the furrow openers 18 have their respective rods 38 passing through the same arm 42 of the lifter bar 40. In order to achieve some individual adjustment of each of the furrow openers 18 and in order to provide for the exigency of the furrow openers 18 striking a rock, the compression spring 50 is provided which permits its corresponding furrow opener 18 to move upwardly against the compression of the spring 50 if it strikes a rock. Adjustment of the individual springs 50 on the several furrow openers 18 can be accomplished by adjustment of the pin 48 in any one of several openings 54 through the rod 38.

All of the above referred to elements, with the exception of the press and a gauge wheel attachment 20, are conventional in their construction, arrangement, and function and are referred to and described herein only because an understanding of such function is necessary for an appreciation of the manner in which applicant's attachment functions.

Applicant's press and gauge wheel attachment includes two L-shaped brackets 56 fixed, as by means of bolts 58, to the forward portion of the frame 14 to which the furrow openers 18 are pivoted at 24. Pivoted to the L-shaped brackets 56 at 64 are two brackets 66 which a are also L-shaped. The bottom leg of the "L" of the brackets 66 are bolted to a cross frame member 62 by bolts 68. The bolts 68 pass through openings in the cross frame member 62 and through slots 72 in the bottom portion of the "L" of the bracket 66. Accordingly, the cross frame 62 may pivot about an axis passing through the pivots 64 of the respective brackets 66. A longitudinal frame 60 is fixed at its forward end to the cross frame member 62 by one of the bolts 68 and by the bolt 74. Thus the longitudinal frame member 60 also pivots about the axis passing through the pivots 64. At its rearward end the longitudinal frame member 60 is supported by a press and gauge wheel 70 journaled upon a suitable axis 76 and having an upwardly extending support member 78. The upstanding support 78 is clamped by means of plates 82 and 84, having bolts 86 passing therethrough, to an upstanding U-shaped channel member 80. At its bottom the U-shaped channel member 80 is welded at right angles to another U-shaped channel member 88 which is fixed, as by bolts 90, to the longitudinal frame member 60. It will be noted that the upstanding support member 80 has its "U" opening outwardly of the longitudinal frame member 60 thus to receive the upstanding support 78 which is round in cross section. When the bolts 86 are clamped tight the round support 78 will be firmly clamped between the upstanding support 80 and the plate 84.

Figure 7:
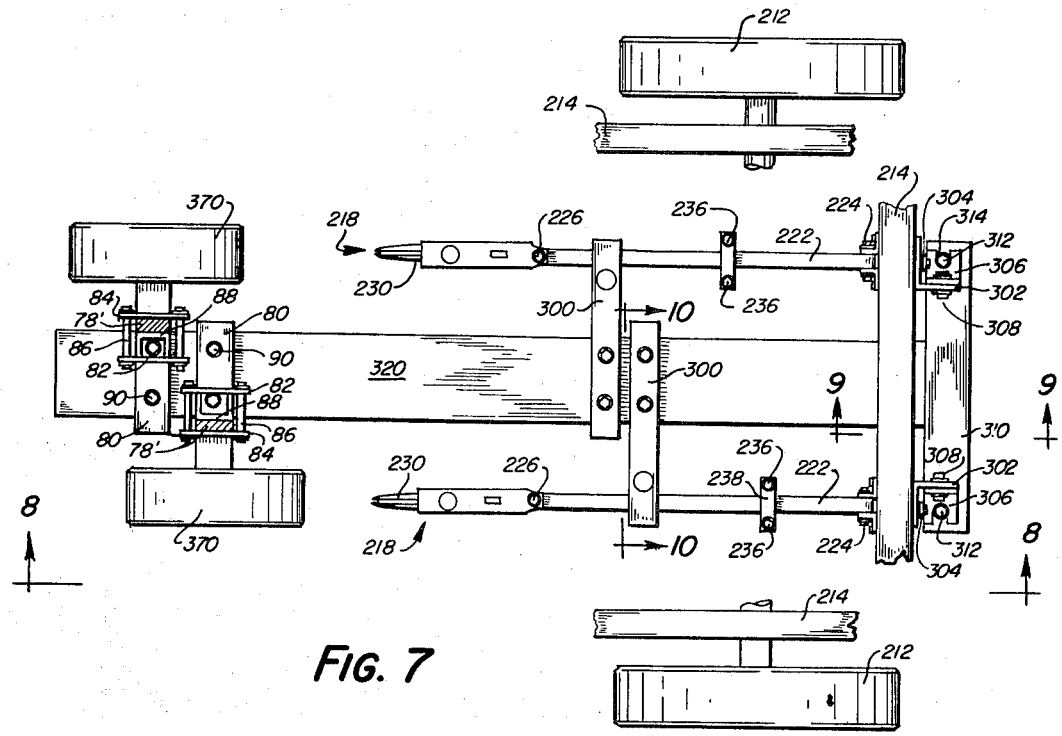
FIG. 7 is a view similar to FIG. 2 showing a modified form of my invention.
Figure 8:
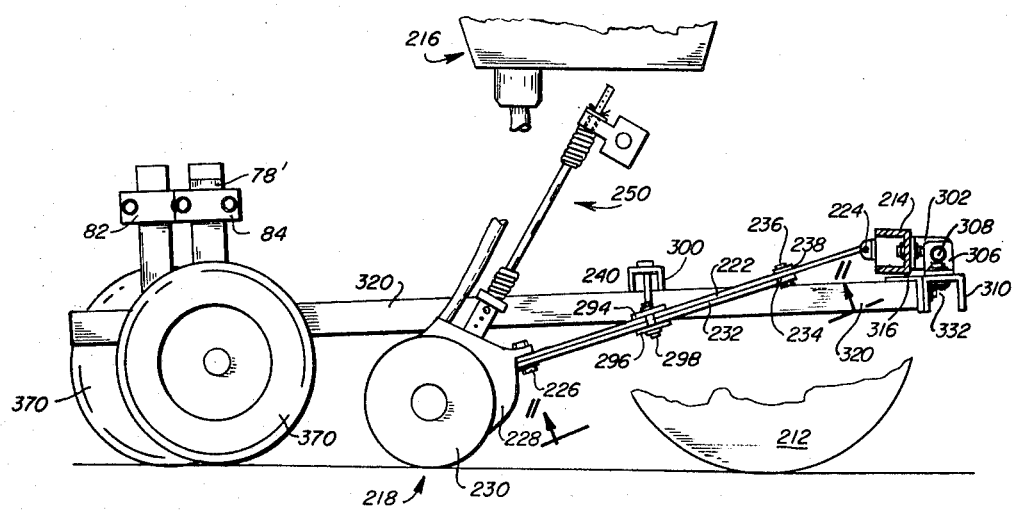
FIG. 8 is the view taken along the line 8–8 of FIG. 7.

In the interests of economy the press and gauge wheel attachment shown is designed to accommodate parts which a farmer may have readily available. For example, the press and gauge wheel 70 together with its axil 76 and its round upstanding support 78 may be obtained from many conventional corn cultivators. Some conventional corn cultivators, however, have a rectangular upstanding support and the support bracket 80, 88 is designed to accommodate such a member as well. FIGS. 7 and 8 show such a press and gauge wheel 370 supported by an upstanding rectangular-shaped support 78'. In order to support such a rectangular member 78' the bracket 80, 88 is mounted with the member 80 facing downwardly onto and bolted to the longitudinal frame member 60. In this way the support member 88 will extend upwardly and the "U" will face inwardly with respect to the longitudinal frame member thus presenting a flat outer surface to which the rectangular upstanding support 78' may be clamped by the clamps 82 and 84 by use of the bolts 86 without providing additional mechanism. In this way the farmer may purchase the press and gauge wheel attachment of my invention without purchasing the press and gauge wheels themselves. He may then use the press and gauge wheels from his corn cultivator irrespective of whether its upstanding support is round as shown at 78 in FIG. 2 or rectangular as shown at 78' in FIG. 7. The same attaching brackets (elements 80 through 90) may be utilized for either type merely by reversing the position of the bracket 80, 88.

Intermediate its ends the longitudinal frame member 60 has fixed thereto a laterally extending transfer bar 100. The transfer bar 100 is bolted at 92 to the longitudinal frame member 60. As shown in FIG. 2 the transfer bar 100 is bolted to the top of the longitudinal frame member 60; however, the transfer bar may be bolted beneath the longitudinal frame member 60 if the arrangement of the grain drill to which the attachment is being connected requires it, as described below.

The transfer bar 100 extends laterally from the longitudinal frame member 60 for attachment to the supports 22 of the adjacent furrow opener 18.

As shown in FIGS. 2, 3, 5, and 6, the laterally extending transfer bar 100 overlies the diverging or forked supports 22 of the furrow opener 18. As shown in FIGS. 3, 5, and 6 the furrow opener supports 22 are clamped between two plates 94 and 96. The two plates 94 and 96 clamp the furrow opener supports 22 between them by means of bolts 98 which are drawn tight. Each of the plates 94 and 96 have an opening centrally thereof as indicated at 104 and 106 respectively. Lateral transfer bar 100 has an opening 108 therein in alignment with the openings 104 and 106. A bolt 110 of a diameter less than the diameter of the openings 104, 106, and 108 extends downwardly through said openings to connect the clamp assembly 94—96 to the lateral transfer bar 100. The bolt 110 has at the bottom end thereof a washer 112 of greater diameter than the opening 106 and a nut 114 which is held against accidental loosening by a locknut 116. Since the pivot axis running through the pivots 64 is not in line with the pivot axis of the pivots 24, the lateral transfer member 100 will have a different radius of movement about its pivot axis 64—64 than will the clamp 94, 96 about its pivot axis 24—24. For this reason the bolt 110 has a substantially smaller diameter than the openings 104, 106, and 108 through which it must pass. The difference need not be great since the amount of movement of the respective parts about their respective axes is not great. It has been found that a 7/16-inch bolt in 1-inch holes is sufficient.

A spacer member 118 is provided between the upper clamp element 94 and the underside of the lateral transfer bar 100. While suitable compression elements may be used for this spacer 118 such as a compression coil spring, it has been found that such resilience at this point is not absolutely necessary and that a pipelike rigid tube may be used for the spacer 118 as long as the lateral transfer bar 100 is not tightly clamped to the clamp 94, 96 by the bolt 110. A suitable slack in the arrangement has been found to be one-eighth of an inch. That is to say that the bolt 118 is not drawn tight by the nut 114 but a one-eighth of an inch slack is left. There is probably also some slack present naturally, or developed in use, in the pivots 24 and 64 thus permitting some relative movement between the lateral transfer bar 100 and the clamp numbers 94—96.

The cross frame 62 and the longitudinal frame member 60 together with the press and gauge wheel arrangement 70 are of considerable strength and weight and, accordingly, when in use provide excellent depth control for the furrow opener 18.

In operation, as the device is pulled behind a tractor over the ground in the direction from left to right as shown in FIGS. 2 and 3 the gauge wheel 70 controls the depth of the furrow opener 18. As the ground rises with respect to the frame 14, the gauge wheel 70 will be raised by the surface of the ground acting upon the considerable surface of the gauge wheel 70. As the gauge wheel moves upwardly it carries with it the longitudinal frame member 60 and the cross frame member 62 all of which pivots about the axis 64—64. By virtue of the attachment through the lateral transfer bar 100 the upward movement of the gauge wheel 70 and the frames 60 and 62 will be transferred through transfer bar 100 to the clamps 94, 96. The upward movement of the clamps 94 and 96 in s response to the upward movement of the lateral transfer bar 100 carry with them the furrow support members 22 which pivot about their axis 24-24. Because of the slack built into the connection member shown in FIGS. 5 and 6 the upward movement of the furrow opener 18 will be slightly less, but not much less, than that of the corresponding portion of the press and gauge wheel attachment 20. In the event the ground surface drops away with respect to the frame member 14 the reverse action takes place. In the event that the furrow opener 18 strikes a rock or other hard object it will be raised thereby and transfer its upward movement through the clamps 94, 96 and the associated lateral transfer bar 100 to the longitudinal frame 60 and the associated gauge wheel 70. Because of the weight of the gauge wheel 70 and its framework 60 and 62 the discs members 30 of the furrow opener 18 will not be readily raised by such material as hard clogs of dirt, root stalks, and other like debris through which the furrow opener 18 may cut. In the absence of the weight of the guage wheel 70 and its associated frame 60 and 62 such materials could readily raise the furrow opener 18 against the coil springs 50 which, aside from the relatively light weight of the furrow opener 18, would be the only force urging the furrow opener 18 downwardly.

Having reference to FIG. 3, the conventionally available wheel type grain drills vary slightly with respect to the length of the arm 22 and the height of the pivot axis 24–24 above the ground. Accordingly, the lateral transfer bar 100 and the clamps 94, 96 are so designed as to permit attachment to various conventional forms of wheel type grain drills. For this reason, the lateral transfer bar 100 may be positioned either above the longitudinal frame member 60 as shown in FIGS. 2 and 3 or it may be arranged under the longitudinal member 60. Similarly, the lateral transfer bar 100 may be positioned with its "U" facing downwardly as shown in FIGS. 2 and 3 or facing upwardly either when it is positioned on top or when it is positioned beneath the longitudinal frame member 60. In like manner, the clamps 94 and 96 may be fastened by the bolt 108 below the lateral transfer bar 100 as shown in FIGS. 3, 5, and 6 or may be fastened above the lateral transfer bar 100. These variations, as indicated above, will depend upon the height and length of the support members 22. By this mere repositioning of parts there is ample variation to accommodate almost all known commercial wheel type grain drills. In a few rare instances it may also be necessary to adjust the length of the bolt 108 and of the spacer member 118. In all of these instances, however, the functioning of the device is the same as described above. Additionally, of course, it is obvious that the lateral transfer bar 100 and the press and gauge wheel 70 could be arranged on the opposite side of the longitudinal frame member 60 in order to control the depth of a furrow opener 18 arranged to its left rather than controlling the furrow opener 18 arranged on its right as shown in FIGS. 2 and 3.

In FIGS. 7, 8, 9, 10, and 11 a modified form of the device is shown wherein a single longitudinal frame member supports two press and gauge wheels to control two separate furrow openers. These figures also show a wheel-type grain drill with a different type of support for the furrow opener. Either of the gauge wheel attachments which I show in the accompanying drawings may be used with either of the wheel-type grain drills shown. That is to say that the press and gauge wheel attachment shown in FIGS. 2, 3, 4, 5, and 6 can also be used with the grain drill shown in FIGS. 7, 8, 9, 10, and 11 and the press and gauge wheel attachment shown in FIGS. 7, 8, 9, 10, and 11 may be used with the grain drill shown in FIGS. 2, 3, 4, 5, and 6.

Having reference to FIGS. 7 and 8 the grain drill shown therein is supported by transport wheels 212 which carry the main frame 214 thereof. Pivoted to the main frame 214 at a number of points 224 are a plurality of furrow opener supports 222 each for a different furrow opener 218. At their rearward ends the supports 222 are fixed at 226 to the casting 228 which has journaled thereon the furrow opening discs 230. In the absence of my press and gauge wheel attachment this furrow opener arrangement 218 together with its associated feeding mechanism 216 and the lifter bar and adjustment rod arrangement 250 function in the same fashion as the corresponding structure in FIGS. 2 and 3. The only difference between the grain drill elements shown in FIGS. 7, and 8 and the grain drill shown in FIGS. 2, and 3 is in the particular type of supports. The support 222 is essentially a piece of strap or spring steel and functions in much the same manner as the support members 22 shown in FIGS. 2, and 3. However, since the member 222 is but a single member and the members 22 shown in FIGS. 2, and 3 are dual members for each furrow opener the member 222 is more flexible in the vertical direction. Additionally, the member 222 is arranged with its flat sides upwardly and downwardly as compared with the members 22 which are arranged with their flat sides laterally. As a result there is some spring action to the member 222. Because of the generally weaker arrangement of the member 222 a reinforcing bar 232 is provided. This reinforcing bar 232 is attached at its rearward end at 226 by the same bolt that attaches the member 222 to the casting 228. At its forward end the reinforcing bar 232 has welded thereto a cross member 234 which is bolted by two bolts 236 to a clamping member 238 (See also FIG. 11). The clamping member 238 and the cross member 234 clamp therebetween the furrow opener support member 222. In this way the bar 232 serves to reinforce the support member 222.

The furrow opener support member 222 together with its reinforcing bar 232 are clamped between two platelike clamping members 294 and 296 by means of bolts 298 as best shown in FIG. 10. These plates 294 and 296 together with their associated bolts 298 are the same as the plates 94 and 96 and their bolts 98 as shown in FIGS. 3, 5, and 6. Similarly, the openings 204 and 206 respectively in the plates 294 and 296 and the associated loose fitting bolt 208 are identical in construction to the corresponding parts shown in FIGS. 3, 5, and 6. Likewise, the spacer 240 is like the spacer 118. The bolt 208 together with its associated nut and locknut 242 and 244 respectively attach the clamps 294 and 296 in the same loose fashion as above described to the lateral transfer bar 300. The lateral transfer bar 300 corresponds exactly to the lateral transfer bar 100 mentioned above.

It will be seen therefore that the press and gauge wheel which I have disclosed with respect to FIGS. 1, 2, 3, 4, 5, and 6 can be used with wheel-type grain drills having the different furrow support member 222 as shown in FIGS. 7, 8, 10, and 11 by using the additional reinforcing bar 232 together with its associated clamp 238.

FIGS. 7, 8, 9, 10 and 11 however, also show a modified form of my press and gauge wheel attachment which serves to control two adjacent furrow openers 118. Here again, my press and gauge wheel attachment as shown in FIGS. 7, 8, 9, 10, and 11 may be used either with the grain drill shown in those FIGS. or with the grain drill shown in FIGS. 2, 3, 4, 5, and 6 wherein there is a different furrow opener support 22 merely by deleting the additional reinforcing bar 232 and its associated clamp 238.

My dual press and gauge wheel attachment as shown in FIGS. 7, and 8 comprises tow L-shaped brackets 302 fixed to the forward portion of the frame 214 such as by means of bolts 304. Pivoted to the outwardly projecting legs of the brackets 302 are two depending L-shaped brackets 306. The brackets 306 are pivoted to the brackets 302 by any conventional means such as bolts 308. The lower legs of the L-shaped brackets 306 are attached by bolts 312 to cross frame member 310. Suitable slots such as those shown at 314 may be provided in the lower legs of the brackets 306 in order to accommodate different spacings of openings in the frame 214 for the bolts 304 and to accommodate the various openings for the bolts 312 which attach the cross frame 310. The longitudinal frame member 320 is attached at its forward end to the cross frame member 310 as best shown in FIGS. 8 and 9. The longitudinal frame member 320 has at its forward end a facing member 316 bolted thereto at 318. This facing piece 316 bears against one leg of the U-shaped cross frame member 310 and is pivotally attached thereto by means of a bolt 322. The bolt 322 passes through openings 324 and 326 in the face plate 316 and the cross frame member 310 respectively. The openings 324 and 326 are slightly larger than the diameter of the bolt 322, though not greatly so. The bolt 322 has a washer 328 and a nut 332 which serves to lock the face plate 316 to the cross frame member 310. A compression spring 330 is also provided around the bolt 322 between the head thereof and the inside surface of the face plate 316. By this arrangement the longitudinal frame member 320 is tightly but pivotally attached to the cross frame member 310 in order to permit the longitudinal frame member 320 to pivot about the bolt 322. That is to say that the member 320 may pivot about its longitudinal axis.

At its rearward end the longitudinal frame member 320 has two press and gauge wheel attachments generally indicated by the reference numerals 370. It will be seen from FIG. 7 that the press and gauge wheels 370 are arranged with one extending to the left and the other to the right of the longitudinal frame member 320 in the manner described above.

Intermediate its length longitudinal frame member 320 has two lateral transfer arms 300. One of the arms 300 extends to the right for engagement with the furrow opener 218 on the right and the other extends to the left for engagement with the furrow opener on the left. The attachments of the transfer arms 300 to the longitudinal frame member 320 are identical to those for the transfer arm 100 and its associated longitudinal frame members 60 as described above with reference to FIG. 2. The attachments of the lateral transfer arms 300 to the furrow support members 122 has been described above with reference to FIGS. 8, 10 and 11.

In operation the modification shown in FIGS. 7, 8, 9, 10, and 11 functions in much the same manner as does the press and gauge wheel attachment shown in FIGS. 2, and 3. Additionally, however, the press and gauge wheel attachment shown in FIGS. 7, and 8 can pivot about the bolt 322 to the extent that one or the other of the gauge wheels 370 is forced by the surface of the ground to raise or lower to a greater extent than the other press and gauge wheel 370. Rotational movement of the frame member 320 about its bolt 322 is transmitted to the arms 300 and by the transfer arms 300 to the associated furrow openers 218. Additionally, of course, movement of the rearward end of the longitudinal frame member 320 upward or downward about the axis of the pivot points 308 is also transferred to the arms 300 and through them to the associated furrow openers 218.

It will be seen therefor that the amount of movement upwardly or downwardly of any one of the furrow openers 218 as shown in FIGS. 7 and 8 will be a function of the resultant of two possible movements of the longitudinal bar 320. Since the longitudinal bar 320 can pivot longitudinally about the bolt 320 or vertically about the axis of the bolts 308 the resultant movement imparted to the lateral transfer arms 300 will be a function of the combined movement about the two different pivot points and as such the resulting movement of the furrow openers 218 will similarly be a single movement in response to the dual movement possible in the longitudinal bar 320. Additionally, some shifting of weight occurs. As the longitudinal frame member 320 pivots about its bolt 322 in response to unequal forces created by the press and gauge wheel 370 more weight will be shifted to one of the bars 300 and less to the other bar 300. That is to say that more weight will be shifted to the furrow opener 218 that is traversing lower ground and less weight will be placed upon the furrow opener 218 that is traversing higher ground. Of course this movement may be modified somewhat if both gauge wheels 370 raise or lower about the pivot axis passing through the pivot point 308.

It will be seen that by the modification shown in FIGS. 7, 8, 9, and 10 fewer longitudinal frame members 320 will be required. That is to say that instead of removing alternate ones of the existing furrow openers in order to accommodate the press and gauge wheel attachment only every third furrow opener need be removed and replaced with the dual press and gauge wheel arrangement shown in FIGS. 7, and 8. Actually, however, in order that the rows be evenly spaced, say on 12-inch centers, every fourth furrow opener (such as the second, sixth, 10th and 14th will be replaced with the dual press and gauge wheel and every fourth furrow opener (such as the fourth, eighth, 12th and 16th will be made inoperative.

It will be seen that applicant has disclosed a novel means whereby the advantages of a wheel-type grain drill may be achieved in the planting of seeds such as soybean seeds requiring careful depth control of the planting and covering and pressing of the seeds.

I claim:

1. A planting apparatus to be pulled over a field in a forward direction comprising a frame, wheels supporting said frame for movement over the ground, furrow opener means, first elongated attaching means pivotally attaching said furrow opener means to a forward portion of said frame, a seedbox supported on said frame above said furrow opener means, means for conducting seed from said box to a furrow opened by said furrow opener means, press and gauge wheel means, second elongated attaching means laterally of and substantially parallel to said first elongated attaching means, said second attaching means pivotally attaching said press and gauge wheel means to a forward portion of said frame with said press and gauge wheel means longitudinally aligned behind said furrow opener means for closing the furrow over seed deposited therein, means extending laterally from said second attaching means, means connecting said laterally extending means to said first elongated attaching means, and means for pivoting said second elongated attaching means about its longitudinal axis.

2. A grain drill adapted for the planting of corn and soybeans comprising a frame, wheels supporting said frame for movement over the ground, a plurality of furrow opener means, a plurality of first elongated attaching means each pivotally attaching a furrow opener means to a forward portion of said frame, a single seedbox supported on said frame above said furrow opener means, a plurality of seed conducting means for conducting seed from said box to furrows opened by said furrow opener means, press and gauge wheel means, second elongated attaching means laterally of and substantially parallel to said first elongated attaching means, said second attaching means pivotally attaching said press and gauge wheel means to a forward portion of said frame with a press and gauge wheel means longitudinally aligned behind each of said furrow opener means for closing the furrows over seed deposited therein, means extending laterally from said second attaching means, means connecting said laterally extending means to said first elongated attaching means, and means for pivoting said second elongated attaching means about its longitudinal axis.

3. The apparatus of claim 1 including two furrow openers each having first attaching means, two press and gauge wheel means pivotally attached by a single said second attaching means to a forward portion of said frame, and in which said connecting means attaches said laterally extending means to each of said first attaching means.

4. The apparatus of claim 2 including two furrow openers each having first attaching means, two press and gauge wheel means pivotally attached by a single said second attaching means to a forward portion of said frame, and in which said connecting means attaches said laterally extending means to each of said first attaching means.